(12) United States Patent
Koschke et al.

(10) Patent No.: US 8,100,030 B2
(45) Date of Patent: Jan. 24, 2012

(54) JOYSTICK

(75) Inventors: Henning Koschke, Berlin (DE);
Thomas Goebelt, Birkenwerder (DE);
Michael Cemerika, Berlin (DE);
Christian Buchhold-Tomazic,
Oranienburg (DE); **Joachim
Meyer-Quade**, Berlin (DE)

(73) Assignee: CoActive Technologies, LLC., Newton, MA (US)

( * ) Notice: Subject to any disclaimer, the term of this patent is extended or adjusted under 35 U.S.C. 154(b) by 225 days.

(21) Appl. No.: 12/449,251

(22) PCT Filed: Feb. 22, 2008

(86) PCT No.: PCT/EP2008/001396
§ 371 (c)(1),
(2), (4) Date: Jul. 30, 2009

(87) PCT Pub. No.: WO2008/110255
PCT Pub. Date: Sep. 18, 2008

(65) Prior Publication Data
US 2010/0011903 A1    Jan. 21, 2010

(30) Foreign Application Priority Data
Mar. 9, 2007 (DE) .......................... 10 2007 012 278

(51) Int. Cl.
*G05G 11/00* (2006.01)
*G05G 1/00* (2006.01)
*B60K 26/00* (2006.01)

(52) U.S. Cl. .......... 74/484 R; 74/469; 180/315; 180/333
(58) Field of Classification Search ................ 74/89.17, 74/89.18, 89.19, 469, 471 R, 471 XY, 473.1, 74/473.3, 473.33, 484 R; 273/148 B, 148 R; 180/315, 316, 317, 318, 320, 333, 335, 336; 463/38
See application file for complete search history.

(56) References Cited

U.S. PATENT DOCUMENTS

| 4,275,611 | A  | * | 6/1981  | Asher ........................ 74/471 XY |
| 4,607,159 | A  | * | 8/1986  | Goodson et al. .............. 250/221 |
| 4,723,458 | A  | * | 2/1988  | Blok ........................ 74/471 XY |
| 5,969,520 | A  | * | 10/1999 | Schottler .................... 324/207.2 |
| 6,104,382 | A  | * | 8/2000  | Martin et al. ................. 345/161 |
| 6,307,486 | B1 | * | 10/2001 | Takeda et al. ................. 341/20 |
| 6,429,849 | B1 | * | 8/2002  | An et al. ...................... 345/161 |
| 6,573,885 | B1 | * | 6/2003  | McVicar ...................... 345/161 |

(Continued)

FOREIGN PATENT DOCUMENTS
DE          10343141 A1      4/2005
(Continued)

*Primary Examiner* — Justin Krause
*Assistant Examiner* — Adam D Rogers
(74) *Attorney, Agent, or Firm* — Pepper Hamilton LLP

(57) ABSTRACT

A joystick for controlling the functions of machines and/or vehicles comprises an actuator which can be moved in different directions by means of a joint having preferably two degrees of freedom, wherein the back-and-forth motions of the actuator occurring in a first plane are subjected to an active force feedback in the form of an electromotor and a reduction gear, and the back-and-forth movement of the actuator which occurs in a second plane perpendicular to the first plane is subjected to a passive force feedback in the form of a sprung reset device. In order to make such a joystick which allows for a low-cost serial production, the invention proposes that the reduction gear is designed with low backlash and is connected on the output side to the actuator via a preferably leaf-spring assembly which connects a swing arm to a joint part.

11 Claims, 2 Drawing Sheets

U.S. PATENT DOCUMENTS

| | | | |
|---|---|---|---|
| 6,634,454 B2 * | 10/2003 | Sugitani et al. | 180/402 |
| 7,490,530 B2 * | 2/2009 | Ishikawa et al. | 74/471 XY |
| 2004/0003954 A1 | 1/2004 | Sugitani et al. | |
| 2005/0057031 A1 * | 3/2005 | Ahnafield | 280/771 |
| 2005/0073496 A1 * | 4/2005 | Moore et al. | 345/156 |

FOREIGN PATENT DOCUMENTS

| | | |
|---|---|---|
| EP | 1602550 A2 | 7/2005 |
| JP | 11154029 | 6/1999 |

* cited by examiner

JOYSTICK

TECHNICAL FIELD

The present invention relates to a joystick for controlling the functions of machines and/or vehicles.

BACKGROUND DISCUSSION

For controlling the functions of machines and/or vehicles, joysticks, i.e., control levers, are known which have passive force feedback in the form of a spring-acting return to the center or a fixed retention in any position by means of friction. However, control levers having passive force feedback do not provide any information regarding the condition of the machine or vehicle.

DE 103 43 141 A1 discloses a joystick, or control lever, which is equipped with two electromotors, each having a reduction gear for achieving active force feedback. The two reduction gears, and their motors, operate in opposition to each other. The motors having their gears are connected to the grip lever of the joystick by a torsion spring, so that the motors place the control lever in a position which corresponds, for example, to the steering angle.

A joystick or control lever of this type having the aforementioned active force feedback has a very expensive mechanism as well as expensive optical sensors, which results in significant costs.

SUMMARY OF THE INVENTION

Therefore, the objective of the present invention is to provide a joystick or control lever of the aforementioned type for controlling the functions of machines and/or vehicles, which allows for more economical series production. To achieve this objective with regard to a joystick for controlling the functions of machines and/or vehicles, an actuator is provided which can be moved in different directions by means of a joint having preferably two degrees of freedom, whereby the back-and-forth motions of the actuator occurring in a first plane are subjected to an active force feedback from an electromotor and a reduction gear, and the back-and-forth motions of the actuator which occur in a second plane perpendicular to the first plane are subjected to a passive force feedback from a spring-action reset device. The reduction gear is designed with low backlash and is connected on the output side of the actuator via, preferably a leaf-spring management which connects a pivoting lever to a joint part.

As a result of the measures according to the invention, a more cost-effective embodiment of the joystick or control lever is achieved because only one electromotor having a reduction gear is provided, and the other measures are achieved by a simple spring arrangement. The joystick according to the invention uses a mixture of active and passive feedback, where the left-and-right motion of the joystick is responsible for steering and is provided with active force feedback, whereas the forward-and-back motion of the joystick is responsible for accelerating and decelerating, which is designed to be only passive since the joystick is brought back to the zero position by spring force.

One preferred embodiment of the joystick has a reduction gear with a gear wheel that is supported on the output shaft of the electromotor in a rotationally fixed manner and acts upon an inner ring gear segment, which is attached to the pivoting lever. Here the gear wheel, as a reduction gear, acts upon a segment of the inner ring gear, which can also be designed as an outer ring gear, the gear train thus having a sufficiently small degree of backlash. In the event that even more precise positioning is required, a second spring-mounted gear wheel, for example, can act upon the inner ring gear, more specifically on the same axle as that of the first gear wheel, the second gear wheel being supported on the first one in a rotatable manner. Also, in place of a second gear wheel, backlash equalization may be accomplished by using an additional ring gear that is spring-mounted and axially supported. The second gear wheel is axially biased against the first gear wheel by the spring, so that gear backlash is eliminated by spring action. In place of the familiar torsion spring, a leaf spring can be used as the spring element, being attached outside the rotational axle. This can be manufactured more economically and more rapidly.

The positioning of the handle at a specific position is made easier provision of a friction wheel mounted on the output shaft of the electromotor in a rotationally fixed manner, and, preferably two spring-supported braking or friction pads pressed against the friction wheel, the braking or friction pads may be acted upon by an adjustable screw, which is axially biased by a screw.

Advantageous embodiments of the pivoting lever and/or joint part as well as their moving connection are derived by a pivoting lever that has an extension arm on which a first leaf spring is attached, which at its other end is connected to a component on which a second leaf spring is attached, which at its other end is connected a joint part, the axis of the pivoting lever is positioned in the rotational axle of the actuator, and the axis of the joint part is positioned in the rotational axle of the actuator.

Advantageous embodiments of the connection between the actuator and the joint part are derived by fixedly joining the actuator in one place of motion to the joint part, and in the other plane of motion may move relative to the joint part in a spring-elastic manner, or especially by supporting the actuator on the joint part by leaf springs.

Advantageous arrangements and embodiments of the sensors are provided by the provision of a diametrically magnetized ring magnet which cooperates with Hall sensors and is arranged in one plane on the rotational axle of the actuator; or by the provision of an actuator with permanent magnets, that, in response to the motion of the actuator, cooperate with Hall sensors, which are preferably arranged on the joint part.

Further details of the invention may be derived from the following description, in which the invention is described in greater detail and is explained on the basis of the exemplary embodiment depicted in the drawing.

Joystick or control lever 10, which is depicted as a preferred exemplary embodiment of the present invention, controls vehicle functions such as steering left and right and accelerating and decelerating, by way of example. In this context, control lever 10 is provided with an actuator 11 that is connected to an undepicted handgrip and that can move back and forth in two degrees of freedom, i.e., in a first plane and in a second plane that is perpendicular to the first. Whereas the steering of a vehicle is influenced by a motion in the first plane (left and right), the acceleration or deceleration of the vehicle is achieved by a motion of actuator 11 in the plane that is perpendicular thereto (forward and backward).

DETAILED DISCUSSION IN CONJUNCTION WITH THE DRAWINGS

Figure 1:
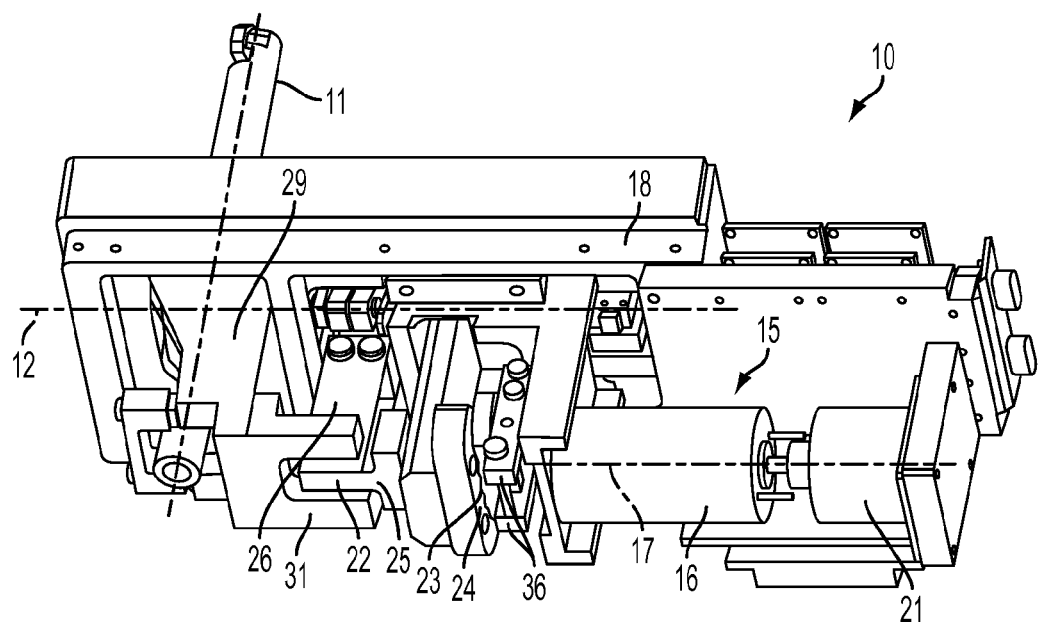
FIG. 1 is a schematic perspective view depicts a joystick for controlling the functions of machines and/or vehicles in accordance with one preferred exemplary embodiment of the present invention.

To manipulate, or pivot, control lever 10 in the first plane, actuator 11 in accordance with FIG. 1 is moved back and forth along a rotational axle 12. To assess the position of control lever 10 and of actuator 11, a ring magnet 13, which is diametrically magnetized, is attached on rotational axle 12 in accordance with FIG. 4. Hall sensors 14, which are provided at the location of the north-south separation of ring magnet 13, generate electrical signals from the changing magnetic field. If redundancy is necessary for sensors 14, they can also be arranged in multiples.

The evaluation of the position of actuator 11 by ring magnet 13 and Hall sensors 14 is transmitted to an actuator 15, which has an electromotor 16 whose rotational axle 17 is arranged at a distance from, and parallel to, rotational axle 12 of actuator 11. In this context, rotational axle 17 of electromotor 16 lies below rotational axle 12 of actuator 11, i.e., it is arranged, with respect to a bearing frame 18, in an area that is facing away from the undepicted handgrip of joystick 10. Connected on one end of electromotor 16, facing away from actuator 11, is an electrical locking brake 21, which is activated if electromotor 16 fails. Attached facing away from locking brake 21 on rotational axle 17 of electromotor 16 is a gear wheel 23 that acts upon a segment of an inner ring gear 24. In this manner, the rotational speed of electromotor 16 is reduced with low backlash.

Figure 4:
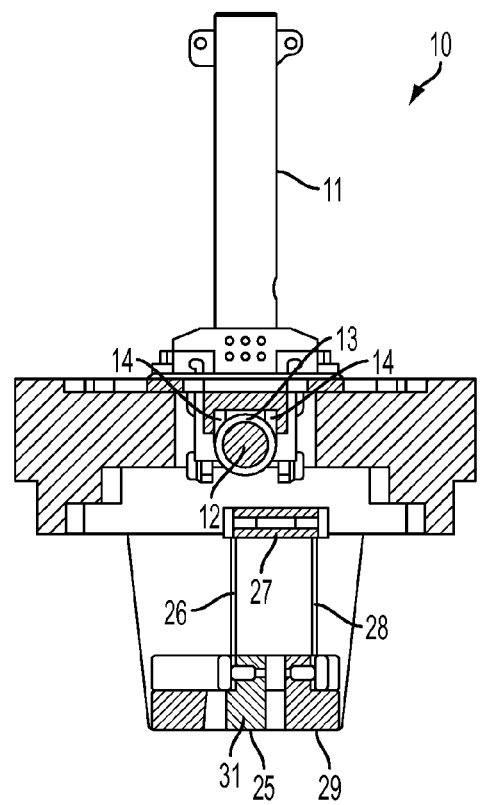
FIG. 4 depicts a cross-section along the line IV-IV of FIG. 2.

Inner ring gear 24 is attached on a pivoting lever 25, whose pivot axis coincides with rotational axle 12 of actuator 11. Pivoting lever 25, facing away from inner ring gear 24, has an extension arm 22, on which one end of a first leaf spring 26 is attached. The other end of the first leaf spring 26, facing away, is attached on a pad 27 that can move in the direction of the spring action (FIG. 4). On its other attachment side, facing away from the attachment side for first leaf spring 26, the pad 27 is fixedly joined to one end of a second leaf spring 28. The other end of second leaf spring 28, facing away, which runs roughly parallel to the first leaf spring 26, is connected to fork-shaped end 31 of a joint part 29. Extension arm 22 of pivoting lever 25 engages between fork-shaped end 31 of joint part 29, on whose one pin the second leaf-spring 28 is attached. The pivot axis of joint part 29 coincides with rotational axle 12 of actuator 11 of control lever 10. Joint part 29 is connected to actuator 11 so as to move together in the first plane in the direction of the back-and-forth motion. In this manner, joystick or control lever 10 remains in the position as directed by the hand of the user, i.e., by active force feedback via actuator 15.

In a manner that is not depicted, in order to achieve even more precise positioning with virtually zero backlash, a second gear wheel, adjacent to gear wheel 23, may act on inner ring gear 24, said second gear wheel being arranged on the same axle as first gear wheel 23, but so as to be rotatable. A spring axially biases the second gear wheel against first gear wheel 23, thus eliminating the backlash of the gear by spring action. However, it is also possible to equalize the backlash using an additional, spring-powered ring gear, which is axially supported. This ring gear as well as ring gear 24 may be designed as inner or outer ring gears.

Figure 3:
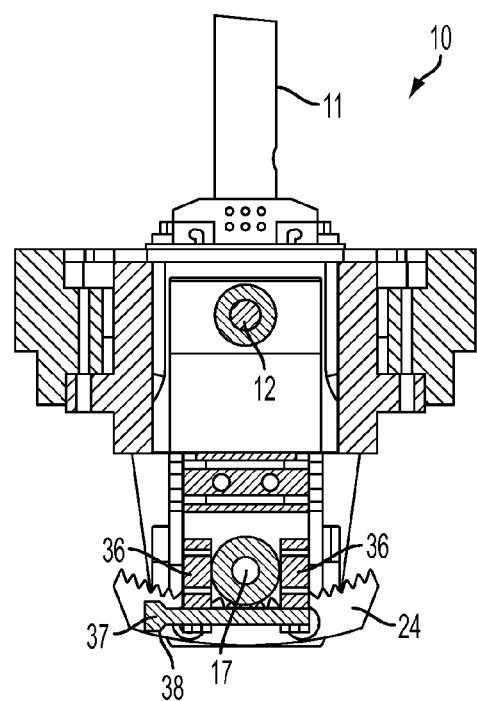
FIG. 3 depicts a cross-section along the line III-III of FIG. 2.

To facilitate the placing of the joystick or control lever 10 in a specific position, in the depicted exemplary embodiment a friction wheel (FIG. 3) is mounted on rotational shaft 17 of electromotor 16 in front of gear wheel 23, two spring-supported braking pads 36 being pressed against the friction wheel. Both breaking pads 36 are pressed together by a screw 27, and a spring, for example a spiral spring, is arranged beneath head 38 of said screw in an undepicted manner, so that the friction can be halted by rotating screw 37.

Figure 2:
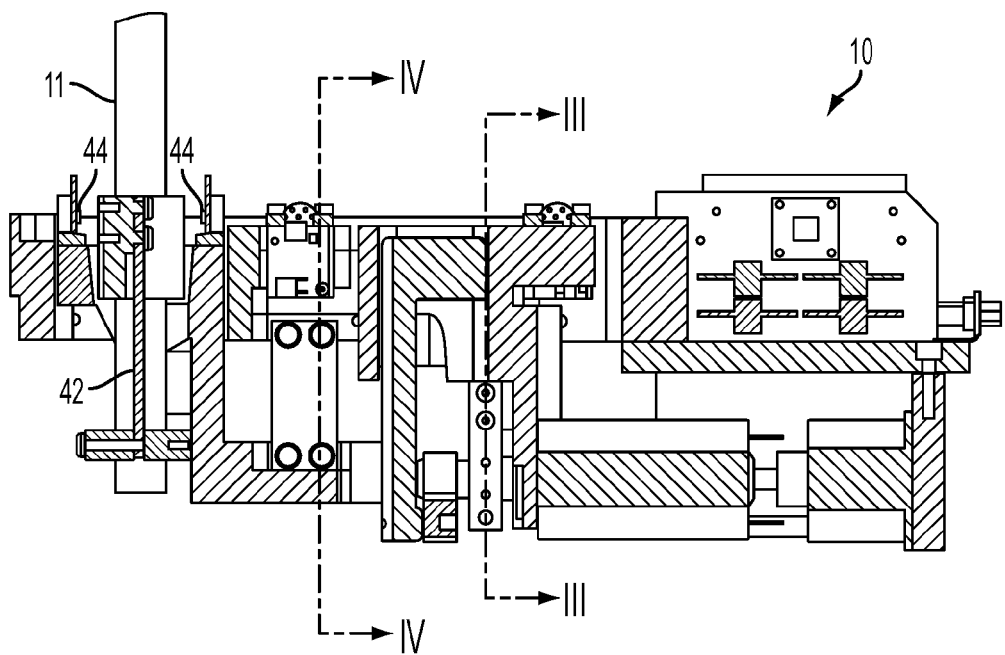
FIG. 2 depicts a central longitudinal cross-section of the joystick according to FIG. 1.

The motion of actuator 11 of joystick 10 in the second plane, which is perpendicular to the first plane, may be seen from FIG. 2. Actuator 11 is attached to joint part 29 on both sides by leaf springs 42. In this way, actuator 11 is supported on joint part 29 in such a way as to be able to pivot back and forth. If a force is exerted by the user on joystick or control lever 10 in one or the other direction in this second plane, actuator 11 can move by spring action in a corresponding range in the one or the other direction. This motion is analyzed by Hall sensors 44, which are attached on joint part 29. Joint part 29 in this area is configured as a ring, through which actuator 11 extends. Both Hall sensors 44, therefore, are situated diametrically opposite each other, so that the motion of actuator 11 can be detected in both directions. Hall sensors 44 may be pivoted along with joint part 29 so that any pivoting of actuator 11 in the second plane may be detected in every pivoting position of actuator 11 in the first plane. In response to a pivoting in the second plane, as the magnet moves toward or away from actuator 11, the magnetic field at the sensor changes in such a way that the sensor signal changes accordingly.

For supporting actuator 11 on joint part 29, a swivel may also be provided in place of leaf springs 42, the spring action then being accomplished by torsion springs, by way of example.

Obviously, in addition to the exemplary embodiments described above, other equivalent exemplary embodiments are also possible.

The invention claimed is:

1. A joystick for controlling the functions of machines and/or vehicles, having:
    an electromotor;
    a reduction gear;
    a spring action reset device;
    a leaf-spring arrangement;
    a pivoting lever;
    a joint part;
    an actuator which can be moved in different directions by means of a joint having at least two degrees of freedom, whereby back-and-forth motions of said actuator occurring in a first plane are subjected to an active force feedback from said electromotor and said reduction gear, and the back-and-forth motions of said actuator which occur in a second plane perpendicular to the first plane are subjected to a passive force feedback from said spring-action reset device, wherein:
    said reduction gear is connected on an output side to said actuator via said leaf-spring arrangement which connects said pivoting lever to said joint part.

2. The joystick as recited in claim 1, wherein:
    said reduction gear has a gear wheel that is supported on an output shaft of the electromotor in a rotationally fixed manner and acts upon an inner ring gear segment, which is attached to said pivoting lever.

3. The joystick as recited in claim 1, further having:
    a friction wheel mounted on an output shaft of said electromotor in a rotationally fixed manner, and wherein:

two spring-supported braking or friction pads can be pressed against said friction wheel.

4. The joystick as recited in claim 3, wherein:
said breaking pad or pads are acted upon by an adjustable screw.

5. The joystick as recited in claim 1, wherein said pivoting lever has an extension arm, on which a first leaf spring of said leaf spring arrangement is attached, wherein the first leaf spring is connected to a component on which a second leaf spring is attached, wherein the second leaf spring is connected to said joint part.

6. The joystick as recited in claim 5, wherein:
said joint part is positioned in such that it moves together with a rotational axle of said actuator.

7. The joystick as recited in claim 6, wherein:
said actuator moves relative to said joint part in a second plane of motion.

8. The joystick as recited in claim 7, wherein:
said actuator is supported on said joint part by leaf springs.

9. The joystick as recited in claim 1, wherein:
said actuator in one plane of motion is fixedly joined to said joint part.

10. The joystick as recited in claim 1, wherein:
a diametrically magnetized ring magnet, which cooperates with Hall sensors, is arranged in one plane on a rotational axle of said actuator.

11. The joystick as recited in claim 1, wherein:
actuator permanent magnets are provided that, in response to the motion of said actuator, cooperate with Hall sensors, which are arranged on said joint part.

* * * * *